United States Patent [19]

Dorer et al.

[11] Patent Number: 5,061,658

[45] Date of Patent: Oct. 29, 1991

[54] ORANGE DECORATIVE PAINT WITHOUT NOXIOUS SUBSTANCES

[75] Inventors: Kai Dorer, Heusenstamm; Holger Jarnicki, Schmitten, both of Fed. Rep. of Germany

[73] Assignee: Degussa Aktiengesellschaft, Frankfurt am Main, Fed. Rep. of Germany

[21] Appl. No.: 563,154

[22] Filed: Aug. 3, 1990

[30] Foreign Application Priority Data

Aug. 9, 1989 [DE] Fed. Rep. of Germany ....... 3926335

[51] Int. Cl.$^5$ .......................... C03C 8/14; C03C 14/00
[52] U.S. Cl. ........................................ 501/17; 501/32; 106/457; 106/459
[58] Field of Search ................. 106/457, 459; 501/17, 501/32

[56] References Cited

U.S. PATENT DOCUMENTS

| | | | |
|---|---|---|---|
| 4,224,074 | 9/1980 | Reade | 501/25 |
| 4,285,726 | 8/1981 | Hund et al. | 106/459 |
| 4,289,745 | 9/1981 | Patil | 106/459 |
| 4,317,683 | 3/1982 | Eppler | 106/459 |
| 4,818,298 | 3/1989 | Nelson et al. | 501/17 |

*Primary Examiner*—Mark L. Bell
*Attorney, Agent, or Firm*—Beveridge, DeGrandi & Weilacher

[57] ABSTRACT

A decorative orange paint is obtained by using 15 to 30% by weight of an orange pigment together with 70 to 85% by weight of a glass frit. The orange pigment comprises 10 to 13% by weight of alkali metal oxide, 10 to 14% by weight of ferric oxdide, 30 to 35% by weight of aluminum oxide, and 40 to 45% by weight of silica. the glass frit comprises 35 to 60% by weight of silica, 15 to 35% by weight of boron oxide, 3 to 8% by weight of zirconium oxide, 2 to 8% by weight of aluminum oxide, 10 to 18% by weight of sodium or potassium oxide or a mixture thereof, and 2 to 6% by weight of lithium oxide.

5 Claims, No Drawings

ORANGE DECORATIVE PAINT WITHOUT NOXIOUS SUBSTANCES

BACKGROUND OF THE INVENTION

The present invention relates to an orange-colored decorative paint without noxious substances. The paint comprises 15 to 30% by weight of an orange-colored pigment and 70 to 85% by weight of a glass frit.

Decorative paints are comprised of a colored pigment and a glass frit and are used to color porcelain, stoneware and other ceramic products. They are particularly useful for coloring tiles.

Orange-colored decorative paints are comprised in most cases of cadmium-sulfo-selenides as the color pigment and lead- and cadmium-containing glass frits. Such a glass frit may for instance be comprised of 15% by weight of PbO, 4% by weight of CdO, 10% by weight of alkali oxide, 8% by weight of $Al_2O_3$, 48% by weight of $SiO_2$, and 15% by weight of $B_2O_3$. Although these decorative paints are resistant to weak acids and bases, they are nevertheless adversely affected, in part, by strong acids and bases whereby toxic lead and cadmium compounds may be released from the glaze.

Therefore, one object of the present invention was to develop an orange decorative paint without noxious substances and which is comprised of 15 to 30% by weight of an orange pigment and 70 to 85% by weight of a glass frit which does not contain toxic heavy metals.

SUMMARY OF THE INVENTION

In attaining the above as well as other objects, one feature of the invention resides in utilizing (1) a pigment which comprises 10 to 13% by weight of an alkali metal oxide, 10 to 14% by weight of ferric oxide, 30 to 35% by weight of aluminum oxide, and 40 to 45% by weight of silica, and (2) a glass frit which comprises 35 to 60% by weight of silica, 15 to 35% by weight of boron oxide, 3 to 8% by weight of zirconium oxide, and 2 to 8% by weight of aluminum oxide, 10 to 18% by weight of sodium or potassium oxide or a mixture thereof, and 2 to 6% by weight of lithium oxide.

Orange pigments are preferably comprised of 42 to 45% by weight of silica, 31 to 33% by weight of aluminum oxide, 10 to 13% by weight of alkali metal oxide and 11 to 12% by weight of iron oxide. It is also preferable that a glass frit comprised of 50 to 58% by weight of silica, 18 to 21% by weight of boron oxide, 3.5 to 5% by weight of zirconium oxide, 4.5 to 6% by weight of aluminum oxide, 10 to 13% by weight of sodium or potassium oxide or a mixture thereof, and 2 to 4% by weight of lithium oxide is used.

Since these pigments and glass frits contain no toxically dangerous heavy metals, no toxic heavy metal compounds can therefore be released from them.

The burning-in of these decorative paints takes place at 650° to 1,000° C. for a period between 0.5 to 5 hours.

DETAILED EMBODIMENT OF THE INVENTION

Example

The following example explains the invention in more detail:

20% by weight of an orange pigment comprised of 43% by weight of $SiO_2$, 33% by weight of $Al_2O_3$, 12% by weight of $R_2O$ (8% $Na_2O$ and 4% $Li_2O$) and 12% by weight of $Fe_2O_3$ are mixed well with 80% by weight of a glass frit comprised of 56% by weight of $SiO_2$, 20% by weight of $B_2O_3$, 4.5% by weight of $ZrO_2$, 6% by weight of $Al_2O_3$, 11% by weight of $Na_2O$ and $K_2O$ and 2.5% by weight of $Li_2O$, and are then burnt in on a tile for 0.5 hours at 1,000° C. The result is an orange decoration which is resistant to acids and bases.

Conventionally available materials can be used for the various ingredients of the compositions of this invention.

It will be appreciated that the instant specification and claims are set forth by way of illustration and not limitation and that various modifications and changes may be made without departing from the spirit and scope of the present invention.

What is claimed:

1. An orange decorative paint, which does not contain toxic heavy metals, comprising 15 to 30% by weight of an orange-colored pigment and 70 to 85% by weight of a glass frit, wherein said orange-colored pigment comprises 10 to 13% by weight of alkali oxide, 10 to 14% by weight of ferric oxide, 30 to 35% by weight of aluminum oxide, and 40 to 45% by weight of silica and wherein said glass frit comprises 35 to 60% by weight of silica, 15 to 35% by weight of boron oxide, 3 to 8% by weight of zirconium oxide, 2 to 8% by weight of aluminum oxide, 10 to 18% by weight of sodium or potassium oxide or a mixture thereof and 2 to 6% by weight of lithium oxide.

2. The orange decorative paint according to claim 1 wherein said orange-colored pigment comprises 42 to 45% by weight of silica, 31 to 33% by weight of aluminum oxide, 10 to 13% by weight of alkali metal oxide, and 11 to 12% by weight of ferric oxide.

3. The orange decorative paint according to claim 1 wherein said glass frit comprises 50 to 58% by weight of silica, 18 to 21% by weight of boron oxide, 3.5 to 5% by weight of zirconium oxide, 4.5 to 6% by weight of aluminum oxide, 10 to 13% by weight of sodium or potassium oxide or a mixture thereof, and 2 to 4% by weight of lithium oxide.

4. The orange decorative paint according to claim 1 wherein said paint is comprised of 20% by weight of said orange-colored pigment and 80% by weight of said glass frit, wherein said orange-colored pigment is comprised of 43% by weight of silica, 33% by weight of aluminum oxide, 8% by weight of sodium oxide, 4% by weight of lithium oxide, and 12% by weight ferric oxide, and wherein said glass frit is comprised of 56% by weight of silica, 20% by weight of boron oxide, 4.5% by weight of zirconium oxide, 6% by weight of aluminum oxide, 11% by weight of sodium oxide and potassium oxide, ad 2.5% by weight of lithium oxide.

5. The orange decorative paint according to claim 1, comprising 15 to 30% by weight of an orange-colored pigment and 70 to 85% by weight of a glass frit, wherein said orange-colored pigment consists essentially of 10 to 13% by weight of alkali oxide, 10 to 14% by weight of ferric oxide, 30 to 35% by weight of aluminum oxide, and 40 to 45% by weight of silica and wherein said glass frit comprises 35 to 60% by weight of silica, 15 to 35% by weight of boron oxide, 3 to 8% by weight of zirconium oxide, 2 to 8% by weight of aluminum oxide, 10 to 18% by weight of sodium or potassium oxide or a mixture thereof and 2 to 6% by weight of lithium oxide.

* * * * *